United States Patent [19]
Doak

[11] Patent Number: 5,833,151
[45] Date of Patent: Nov. 10, 1998

[54] GLASS CONTAINER HAMMER MILL

[76] Inventor: Ron Doak, P.O. Box 820113, Houston, Tex. 77282

[21] Appl. No.: 730,820

[22] Filed: Oct. 17, 1996

Related U.S. Application Data

[63] Continuation-in-part of Ser. No. 498,252, Jun. 29, 1996, abandoned.

[51] Int. Cl.⁶ .................................................. B02C 19/14
[52] U.S. Cl. .......................... 241/37.5; 241/99; 241/100; 241/166; 241/101.78; 241/189.1
[58] Field of Search ........................ 241/166, 99, 285.1, 241/189.1, 194, 195, 36, 33, 37.5, 101.78

[56] References Cited

U.S. PATENT DOCUMENTS

| | | | |
|---|---|---|---|
| 2,505,674 | 4/1950 | Knight | 241/37.5 |
| 3,353,756 | 11/1967 | Morgenson | 241/99 |
| 4,319,146 | 3/1982 | Wires | 241/37.5 |
| 4,579,287 | 4/1986 | Brown | 241/37.5 |
| 4,786,000 | 11/1988 | Weil et al. | 241/36 |
| 5,226,606 | 7/1993 | Jasperson et al. | 241/99 |
| 5,486,050 | 1/1996 | Lenting | 241/37.5 |

FOREIGN PATENT DOCUMENTS

| | | | |
|---|---|---|---|
| 834712 | 2/1970 | Canada . | |
| 2447703 | 10/1980 | France | 241/37.5 |
| 745495 | 7/1980 | U.S.S.R. | 241/37.5 |

Primary Examiner—Mark Rosenbaum
Attorney, Agent, or Firm—Wendy K. Buskop

[57] ABSTRACT

An apparatus and method for smashing empty glass receptacles into predetermined sizes to facilitate the collection, storage, transportation and recycling of glass chard and/or cullets is disclosed. The apparatus includes a cabinet or housing that is comprised of two sections. The upper section has two compartments, a rear compartment that contains the motors, gears and electrical wiring. The upper front section has a hinged lid that can be opened to expose a loading trough. The lower section is sealed from the upper section by means of a partition that contains a rotary tray door that remains in the closed position until the upper lid has been closed and the safety circuit activated and the hammer mill blades have reached optimum revolution speed. The rotary hammer mill blades are attached by means of the vertical drive shaft at the under side of the upper and lower chamber partition just below the slideable tray door. The lower chamber also holds the glass chard or cullet collection container cradle frame. Another embodiment of the apparatus has a housing having an upper chamber and a lower chamber being separated by a partition, a top and a base. A motor means is mounted within the rearward section and has a pulley shaft connected to a hammer mill blade shaft that has a first end and a second end. The first end extends into the lower chamber. There is a rotatable panel that defines a hole therein sized to fit the hole formed by the partition. The rotatable panel is attached to a rotatable panel shaft. There is a weighing means disposed in the base of the housing and a means for cleaning the forward section, the lower chamber, and the hammer mill blades.

5 Claims, 13 Drawing Sheets

GLASS CONTAINER HAMMER MILL

This is a continuation in part application of application Ser. No. 08/498,252, filed Jun. 29, 1996 now abandoned.

TECHNICAL FIELD

This invention is in the general field of an on-site glass receptacle hammer mill to facilitate the environmentally safe disposal and recycling of primarily glass beer, soda, wine, condiment and food receptacles in bars, restaurants and other establishments generating substantial glass waste in the course of their business or operations. This would also include but not be limited to larger, industrial sized glass receptacle hammer mill and/or glass crushers.

BACKGROUND OF THE INVENTION

Glass receptacles, be they containers for beer, wine, soda, food or condiments, are a problem for the business and/or establishment generating the empties as well as posing as a landfill waste disposal problem when they are dumped as trash and left to nature to assimilate them back into the earth. Unbroken glass receptacles also consume considerable amount of space, critical waste disposal area space that is becoming dangerously scarce throughout the globe. The decomposition of discarded glass receptacles can take centuries.

Most, if not all glass receptacles, can be recycled and reused in the furtherance and manufacture of new glass receptacles. This would save valuable landfill waste disposal space; reduce finite mineral consumption; plus conserve the amount of energy required in recycling glass receptacles rather than manufacturing the receptacles from raw materials.

A problem arises when conservation-minded individuals and businesses attempt to save and store empty glass receptacles for recycling. The space required for the storage of empty glass receptacles can be considerable, especially in small or enclosed areas such as in bars and restaurants. Transporting these glass containers can also be a problem when the empty glass containers are in their original, unbroken form. Breaking glass containers immediately after use can produce health and safety hazards especially if the breaking is conducted in the beverage, food or condiment serving area. Additionally, the box or container in which the glass receptacles were originally packaged, would not nor could not adequately catch, contain or allow transportation of broken glass chard cullets. This invention addresses the problem of broken glass, including glass dust, so that it's adequately handled to virtually eliminate contamination of the ambient air in the working environment. This is done by means of a dedicated collection bag that can be adequately sealed when transported from the breaking area to the recycling storage area. Empty glass receptacles can be generated in large quantities in a minimum amount of time in even a relatively small establishment. Previous inventions showed various means of crushing or breaking a single bottle at a time and usually didn't provide for the entire process to be encapsulated and/or self-contained from glass receptacle insertion through removal and storage of glass chard cullets for recycling service pickup.

An establishment that is in the food service business with glass receptacles as merely by-products of that service, i.e. bar or restaurant, normally doesn't have the time or means to adequately preserve and store the empty glass containers in the area and usually throw them into the common trash containers to be picked up and delivered to the nearest land fill disposal area.

Previous inventions and all the prior art in this field attempt to address some of the listed problems but most, if not all, do not answer or provide for all of the problems associated with preparing empty glass receptacles for collection, storage and recycling in an effective, economical and safe manner. The patents reviewed: U.S. Pat Nos. 5,350,120; 5,328,106; 5,310,122; 5,289,980; 5,226,606; 5,242,126; 5,215,265; 5,186,403; 5,184,781; and 5,150,844 bear this out.

Thus, this invention addresses all of the above listed problems of trash accumulation, storage and disposal and the opportunities for conservation, energy savings and recycling of a by-product. This invention apparatus and methodology adequately solves the problems addressed above and makes on-site glass receptacle crushing economically feasible, environmentally and occupational safe, plus prepares recyclable glass chard cullets for easy storage, transportation and recycling.

SUMMARY OF THE INVENTION

Described herein is an apparatus and method for smashing empty glass receptacles into pre-determined sizes to facilitate the collection, storage, transportation and recycling of glass chard and/or cullets. This apparatus is a type of hammer mill that, when the glass receptacles are dropped or inserted into the area of the motor driven radius of the horizontally spinning, hardened blades, encountering the blades, and are thereby shattered into pre-determined chard or cullet size. The embodiment of the apparatus described herein includes a cabinet or housing that is comprised of two sections. The upper section has two compartments, a rear compartment that contains the motors, gears and electrical wiring. The upper front compartment has a hinged lid that can be opened to expose a loading trough that would accept a substantial quantity of empty glass receptacles. The lower section is sealed from the upper section by means of a partition that contains a rotary tray door that remains in the closed position until the upper lid has been closed and the safety circuit activated and the hammer mill blades have reached optimum revolution speed. Once the operator has filled the upper trough with the glass receptacles that are to be smashed, a start switch will activate the motor and accelerate the hammer mill blades in a horizontal plane to the pre-determined optimum revolution speed to produce the pre-determined correct size broken glass chard and/or cullets, a rotary or horizontally slideable tray door located in the partition between the upper and lower chambers whereby the rotary tray door is attached to and moved by a motor activated gear drive that turns a pinion attached to the rotary tray door so that the rotary tray door opens or a horizontally located slideable tray door mounted on dual tracks and moved horizontal by means of a pinion motor driving a gear that would then open allowing the glass receptacles to drop into the hammer mill blades. A pinion motor turning a pinion attached to a rotary try door turns the center mounted pinion and turns the rotary tray door through a 360 degree movement thus allowing the glass containers to fall through from the upper loading chamber into the hammer mill break area. The horizontally located, slideable tray door is attached to a pinion motor and pinion gear that drive the slideable tray door back and forth on dual racks. The rotary tray door does not require any reversing motor as it is driven through a 360 degree horizontal plane. The slideable tray door utilizes relay switches that are appropriately mounted to automatically reverse the pinion motor when the slideable tray door reaches its fully opened position and another relay switch is mounted to shut the pinion motor off when the slideable tray door is fully closed and ready for another load of glass bottles.

That upper rear chamber portion, that chamber that does not house the glass receptacle loading trough, is separated by means of a sealing partition. The portion of the upper chamber that is not dedicated as the glass bottle loading trough contains a motor, an electric motor in the preferred embodiment, that is situated in one corner of the cabinet. The motor would be located such that a sheave would be mounted on the bottom or lower end of the motor and would be above and nearest the top of the upper and lower chamber partition. A drive chain or rubber belt would then extend from the motor sheave transversely to the center of the cabinet where it would be matched to a sheave mounted to a drive shaft that extends vertically through the upper and lower chamber partition. The drive shaft would be mounted on flange and pillow block bearings so that the hammer mill blades mounted on the lower end of the vertically mounted shaft would allow the hammer mill blades to rotate horizontally just under the partition of the upper and lower chambers. The mounting of the motor in one corner and transferring the rotary power to the vertical shaft mounted in the center of and through the partition of the upper and lower chambers of the cabinet by means of a chain or belt drive would enable the upper glass receptacle loading trough to be maximized in size loading as many empty glass receptacles as possible.

The rotary hammer mill blades are attached by means of the vertical drive shaft at the under side of the upper and lower chamber partition just below the slideable tray door. The activation of the motor by the operator would, in addition to starting the motor driven hammer mill blades' rotary motion in a horizontal plane, would also activate the rack and pinion drive gear (if it is desirable to have the slideable tray door to be independently motor and gear driven), and open the slideable tray door allowing the glass receptacles to drop from the upper loading trough down into the spinning hammer mill blades thus smashing the glass receptacles into the predetermined size desired.

If the apparatus does not employ the motor/gear rack and pinion drive system, a manual slideable tray door mechanism is also shown whereby the operator can manually open the slideable tray door to allow the glass receptacle to fall into the rotating hammer mill blades after the upper trough lid has been closed, the circuit switch closed and the motor driven hammer mill blades reach or are at optimum revolutions per minute as determined by the cullet size desired by the recycling industry. The slideable tray door would be located adjacent to the front of the cabinet and extend in two quarter pie shapes nearer to but not entirely reaching the midpoint of the upper and lower chamber partition where the vertical drive shaft is located. Opening the slideable tray door would expose the hammer mill blades below an elliptical-shaped aperture allowing the glass receptacles to drop through and into the hammer mill blades thus shattering into predetermined shards and/or cullets.

The blades are surrounded or girdled by a tapered metal skirt to ensure that the hammer mill blades contact with the glass receptacle and the shattered, flying glass cullets can not be flung uncontrollably throughout the lower chamber but are directed so they drop into the cullet collection container bag.

The lower chamber also holds the glass chard or cullet collection container cradle frame. The collection container cradle frame can be made of sheet metal or plastic or any other such material so as to allow the actual bag or chard collection container to be held in place until the collection container is full and requires removal and replacing. The container cradle frame is bottomless. It is best manufactured to include tapered upper flanges that will hold the actual collection bag in place while it is being filled.

To remove the cullet filled bag from the lower chamber, the collection container cradle frame can be pulled from the lower chamber by means of an attached handle.

This described apparatus and methodology can be of any size to enable operators to use in an industrial application but the herein described type apparatus would fit in a bar, restaurant or similar type establishment.

Another configuration of the apparatus would be to have a spherical door that pivots around a center tube that houses the drive shaft and two flange bearings. The center tube would be sealed by multiple sealing points, the flange bearings and several layers of sealing compounds.

The electrical drive motor would be mounted so that the drive pulleys would be on top of the motor drive shaft and the hammer mill blades shaft.

Instead of a pinion motor activating and pulling and pushing the loading bin door open and shut, the center mounted, spherical door would be activated by a DC drive motor and rotate around the center tube so that the loading bin door is opened and shut by a complete revolution of the spherical loading bin door.

In another embodiment of the present invention, there is provided an apparatus for crushing glass that uses hammer mill blades that control the movement of a door for accessing the hammer mill blades. As shown previously, the base of the apparatus can have wheels to make it easier to move the apparatus. The apparatus has a housing halving an upper chamber and a lower chamber being separated by a partition, a top and a base The upper chamber is divided into a forward section and a rearward section by a wall. The rearward section is sealed from the forward section and the lower chamber by the wall and the partition. The forward section defines an opening therein that is positioned adjacent to the top of the housing. The partition defines a hole therein that is substantially the same size as the opening defined by the forward section A motor means is mounted within the rearward section having a pulley shaft connected to a hammer mill blade shaft having a first end and a second end. The first end extends into the lower chamber. A first hammer mill blade and a second hammer mill blade are attached to the first end of the hammer mill blade shaft.

A hinged lid is attached to and in covering relationship with the opening defined by the forward section. A funnel means has mouth portion and a neck portion. The mouth portion is connected to the partition and the neck portion is connected to a receiving means. The funnel means receives the crushed glass cullets and funnels them towards the receiving means.

There is a rotatable panel that defines a hole therein sized to fit the hole formed by the partition so that more than one glass container may be deposited into the apparatus at one time. The rotatable panel is attached to a rotatable panel shaft. The panel remains in a closed position so that no glass enters the lower chamber when the apparatus in turned off or not activated. Once glass is placed in the forward section and the lid is closed, the hammer mill blades are activated and the rotatable panel shaft moves the rotatable panel to an open position so the glass contacts the moving hammer mill blades. There is a weighing means disposed in the base of the housing and a means for cleaning the forward section, the lower chamber, and the hammer mill blades.

DETAILED DESCRIPTION OF THE PREFERRED EMBODIMENT

Figure 1:
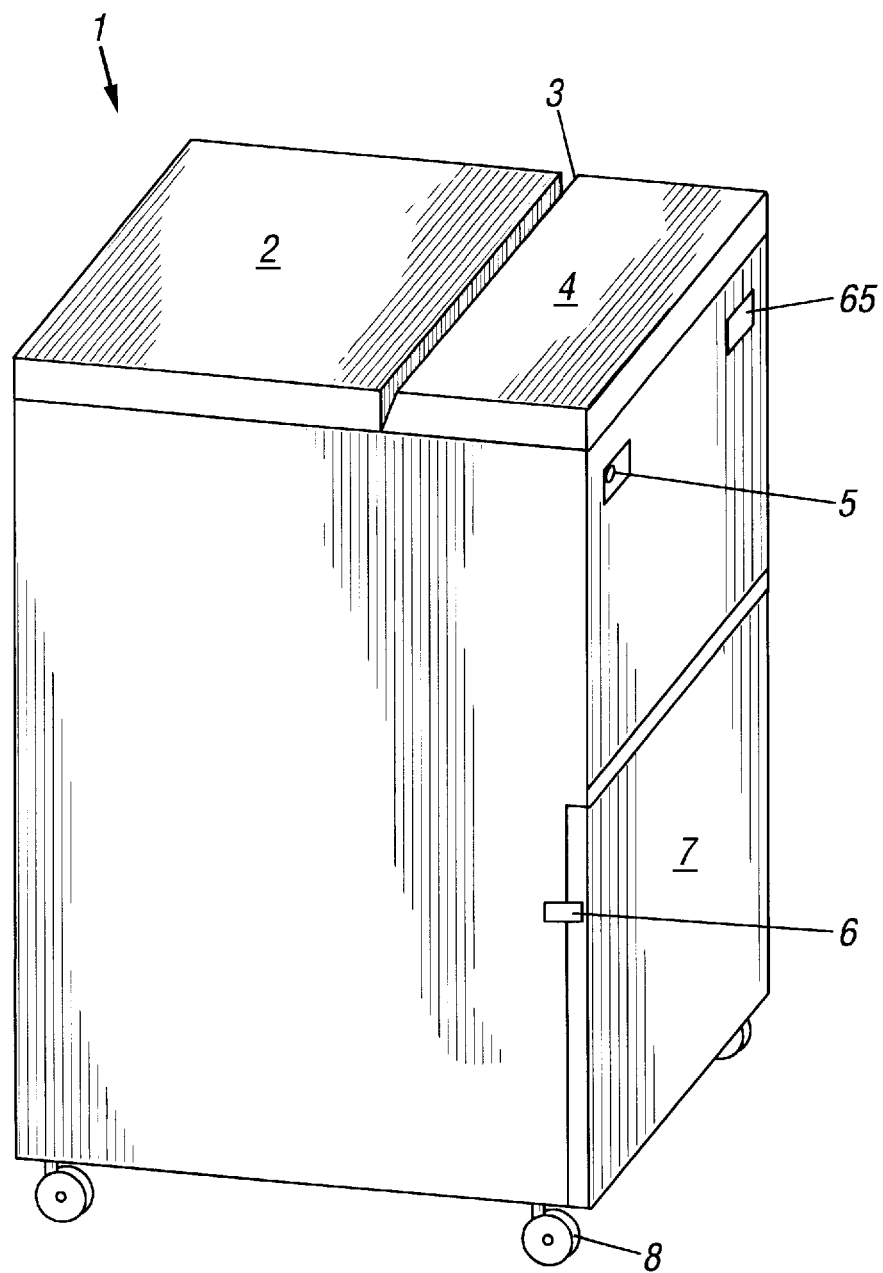
FIG. 1 is the external appearance of the apparatus in a perspective view that embodies the preferred general principals of this invention.

In detail and in which like numerals refer to like parts throughout, FIG. 1 depicts the external appearance of an apparatus that embodies principals of the present invention in a preferred form. The apparatus 1 is seen to be substantially a sealed rectangular box like device with the top encompassing a hinged portion 3 that allows the lid sections 2 to be affixed to apparatus 1 and allow lid section 4 to be opened. Momentary activation switch 5 is shown in the preferred position. Lower section of apparatus 1 shows door 7 latched when closed by latch 6. The apparatus 1 is mounted with omni-directional wheels or rollers 8 to allow apparatus 1 to be easily moved.

Figure 2:
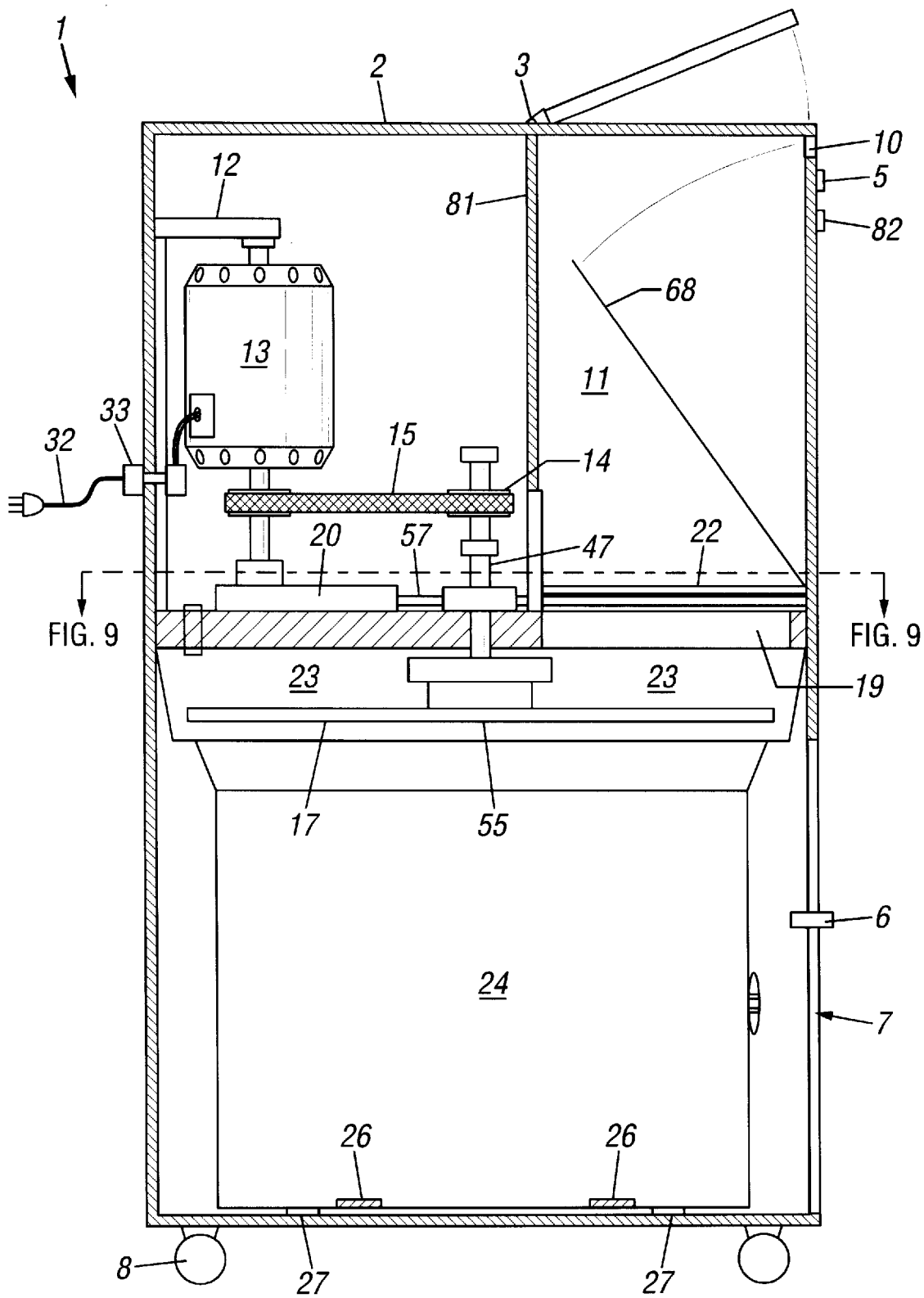
FIG. 2 is a left side cutaway view of FIG. 1 partially in section and illustrating functional elements of this invention that encompass a preferred configuration.

FIG. 2, shows the top of apparatus 1 containing hinge 3 to allow the front lid 4 to be opened 9 to expose collection area 11 for glass bottles for crushing. The apparatus contains an inner mechanical locking device 10 to lock lid 4 closed whenever motor 13 has been activated by pressing momentary switch 5. The mechanical locking device 10 also disables lower compartment 44 from being opened when the motor 13 has been engaged, the hammer mill double blades 17 in motion and the loading bin movable closure door 22 is aperture and/or opened.

The apparatus 1 is divided into an upper chamber 39 and a lower chamber 40 being separated by a partition shelf 19. The upper chamber 39 is also divided and sealed into a forward chamber 11 and a rearward chamber 44 by means of partition 19. Forward Chamber 11 is the glass bottle loading area and is lined with stainless steel sheeting for anti-corrosion and contamination and rearward chamber 44 is the motor, drive shaft, jack shaft, pillow block bearings, motor mounting bracket, interior circuit breaker and ancillary equipment housing area. Forward chamber 11 and rearward chamber 44 are sealed from each other as best as can be with sealing compound.

Motor 13 is mounted against the wall nearest one corner of rearward chamber 44 by means of motor housing bracket 12. Rotary drive shaft 16 has pulley 14 attached. Drive belt 15 drives jack shaft 45 pulley 53 which drives hammer mill blades 17 pulley 46 which is mounted on hammer mill blade rotary drive shaft 47. Drive belt 52 connects jack shaft 45 pulley to hammer mill rotary shaft pulley 53. Rotary drive shaft 16 is mounted between one pillow block bearing 43 and one flange bearing 34. Jack shaft 45 is also mounted between a pillow block bearing 48 and a flange bearing 49. The hammer mill blade rotary drive shaft is also mounted between pillow block bearing 50 and flange bearing 51.

Motor 13 is preferably at least a ½ horsepower 110/120 v electric motor that is electrically connected through circuit breaker box 33 that encompasses a 20 amp breaker. Circuit breaker box 33 is attached by means of electrical cord 32 to any available 110/120 v outlet through electrical junction box 31.

The hammer mill blade rotary drive shaft 47 has two heat-treated, alloy steel, case hardened, hammer mill blades 17 and 25 perpendicular to the hammer mill drive shaft 47 but mounted horizontally so that they meet at the center of the hammer mill blade drive shaft 47 and cross each other at 90° with spacer 55 providing a 1 inch space between the first hammer mill blade 17 and the second hammer mill blade 25. The second hammer mill blade 25 is the lower and longer and than the first hammer mill blade 17. The second hammer mill blade 25 is the lower positioned blade that is approximately four inches longer than the first hammer mill blade 17.

The hammer mill rotary drive shaft 47 is mounted through the upper chamber 39 and lower chamber 40 partition shelf 19 and sealed by means of upper hammer mill rotary drive shaft flange bearing 51 and lower hammer mill rotary drive shaft flange bearing 54. Upper chamber 11 and the adjacent partition shelf 19 has a matching corresponding space similar to a half moon shape in the area forward of chamber 39 and chamber 11 partition 19. Hammer mill blades 17 and 25 are positioned beneath partition 19 by means of a fixed spacer 18 that is permanently affixed to hammer mill rotary drive shaft 47 to ensure the glass bottles would not encounter the hammer mill blades 17 and 25 until they fell into the cullet collection area 24 below partition 19 and inside the funnel shaped hammer mill blade/bottle impact area 23. The inside of the funnel shaped hammer mill blade/bottle impact area 23 is also sheeted with stainless steel.

The upper chamber 11 also called the loading bin has a movable (slideable) tray bottom 22. Bottom 22 cannot move until mechanical locking device 10 has been engaged and momentary switch 5 activated. Bottom 22 is mounted between two geared racks 56 that are attached on opposing sides of chambers 11 and 39 that is driven by pinion gear 57 that is activated by pinion drive motor 58.

When the loading bin area door 4 is opened to load bottles for crushing, the system has closed movable slide door 22. Once the loading bin door 4 has been closed and the mechanical locking device 10 engaged, an operator can push momentary switch 5 to start motor 13 thus engaging the drive belts 15, 59, 60 developing a pre-determined RPM for the hammer mill blades 17 and 25. When a pre-determined RPM of the hammer mill blades has been reached, then a electrical lockout device 61 disengages the rack and pinion drive motor 58 engaging the fixed geared racks 56, that is permanently attached to movable shelf 22, with pinion 57. The electrical lockout device 61 and the mechanical lockout device 10 both ensure that the process could not be interrupted nor upper chamber door 4 or lower chamber door 7 be opened until the cycle was completed. The cycle would include the dual locking of the mechanical lock 10 and the electrical lockout device 61, the activation of motor 13 developing a pre-determined RPM for hammer mill blades 17 and 25 and then engaging pinion drive motor 58 turning pinion 57 that engage geared racks 56 thus aperture movable tray door 22 laterally from chamber 11 into chamber 39 allowing the glass bottles previously loaded in chamber 11 to drop through the aperture 62 into the funnel shaped hammer mill blade/bottle impact area 23 encountering the hammer mill blades 17 and 25 thus breaking into cullets of a pre-determined size and dropping them into a gusseted, disposable bag 63 that is supported by cullet storage box 29 for recovery and recycling.

The bottom of chamber 40 has weight sensors 27 mounted thereon to determine when the cullet collection bag 63 has received a pre-determined weighted accumulation of cullets and electronically transmits a warning signal that activates loaded condition light 65.

FIG. 2 also shows the bottom chamber 40 can be opened by door 7 when the mechanical locking device 5 and the electrical lockout device 61 are not engaged by aperture latch 6 thus allowing cullet storage box 29 to be removed and the gusseted, disposable bag 63 full of cullets to be removed when cullet storage box 29 has been lifted and the hinged bottom 66 drops open. Noise suppression foam and/or other type noise suppression material 67 to be inserted into or placed about all open chambers not affecting any moving parts.

Figure 3A:
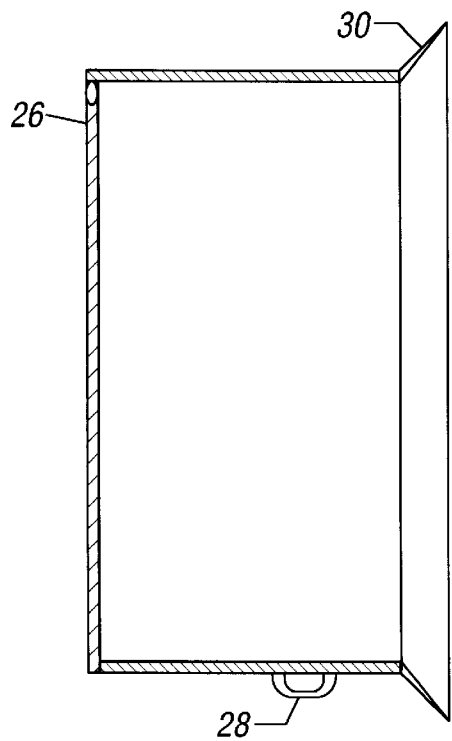
FIG. 3 is a perspective view of the cullet bag cradle frame detailing the preferred configuration.
Figure 3B:
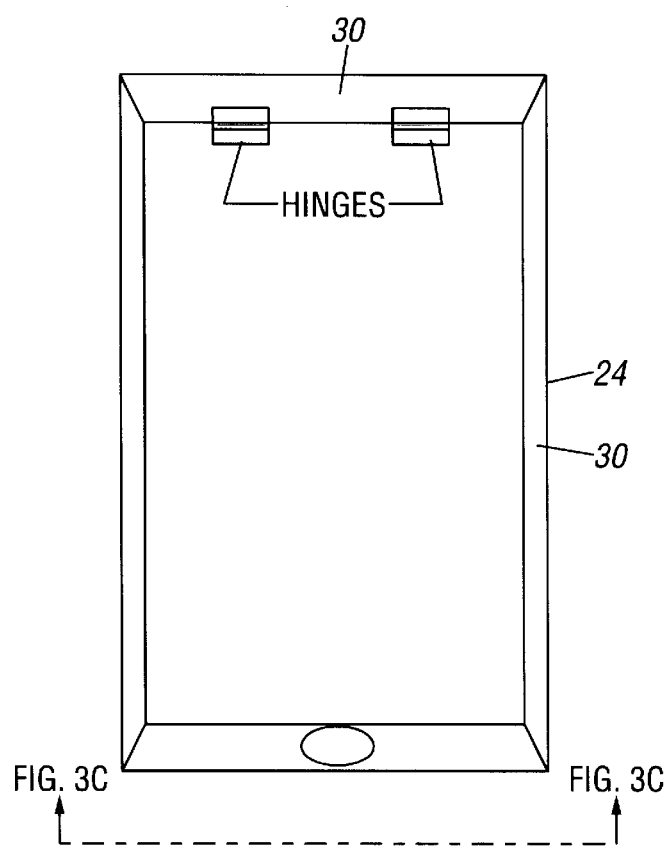
Figure 3C:
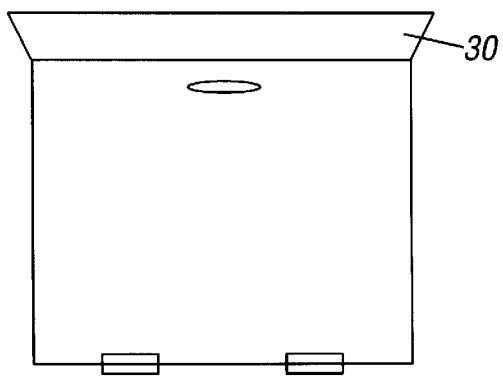

FIG. 3 is a detailed view that shows the cullet storage box 29 is manufactured of a material that will maintain rigidity of shape and size so as to adequately hold gusseted, disposable bag 63 to hold the cullets. The bottom of cullet storage box 29 is hinged by hinges 26 so as to allow the bottom to drop open when the cutlet storage box 29 is lifted vertically. The hinged bottom 66 allows support for gusseted, disposable bag 63 when in the lower chamber 40 and drops open to allow the gusseted, disposable bag 63 full of cullets to remain in place on the floor when the cullet storage box 29 is lifted to remove the disposal bag 63 of cullets.

Figure 4:
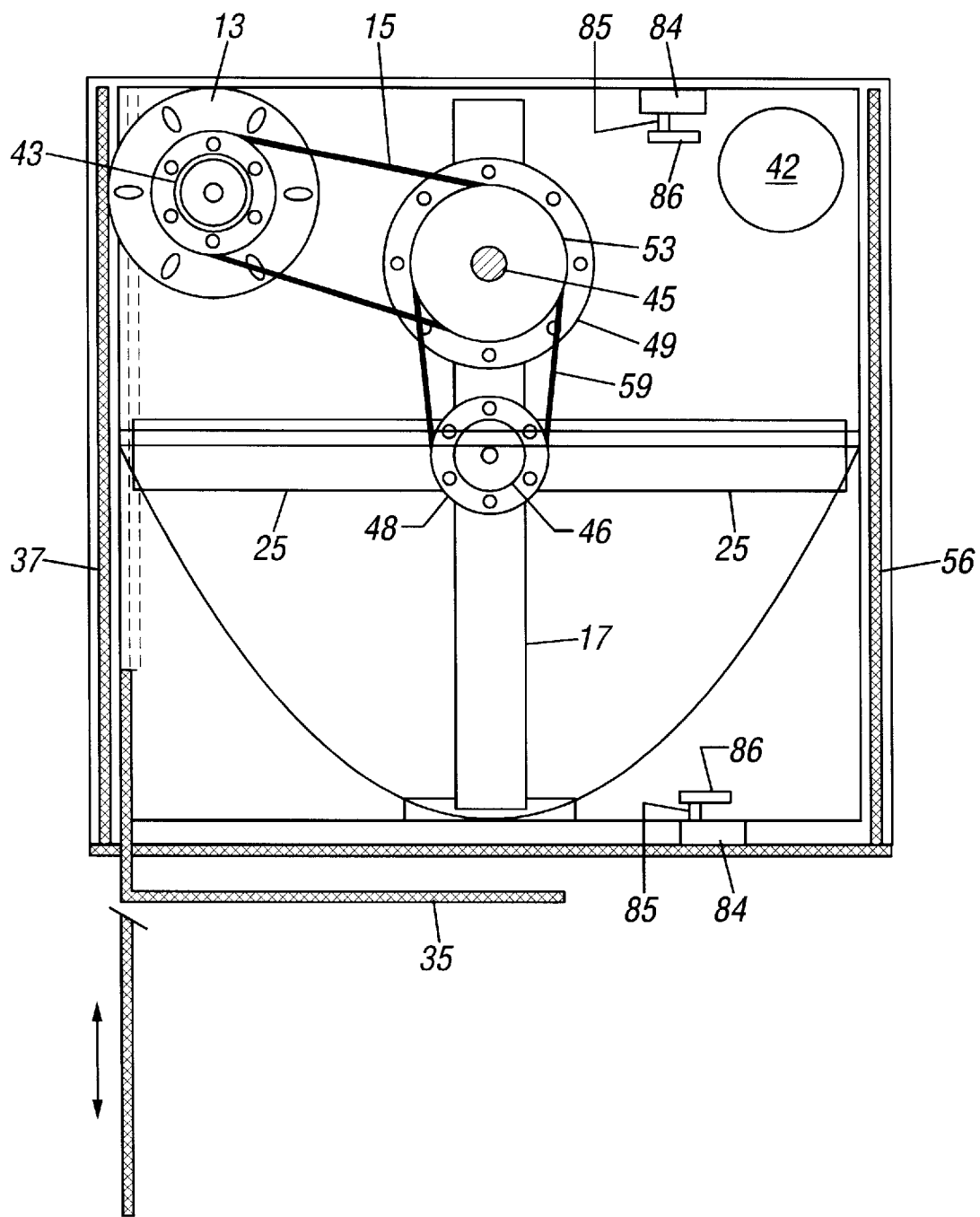
FIG. 4 is a cutaway perspective view of the upper chamber of FIG. 2 embodying a preferred general principal of this inventions configuration and the placement of relay switches, relays and relay contact blocks to energize and stop the pinion motor.

FIG. 4 is a perspective view that shows the arrangement inside cabinet 1 of the motor drive and shaft assembly area 44 the drive motor 13, jack shaft 45 hammer mill blade pulley 46 upper hammer mill blade 25, lower hammer mill blade 17 geared rack 56 movable slideable tray door slot 37 jack shaft bearing 49, jack shaft pulley 53, jack shaft pillow block bearing 48, alternate manual push/pull moveable shelf handle 35, motor drive belt 15 drive belt jack shaft to hammer mill blade shaft 59. The slideable tray door 69 has a relay shim block 86 mounted so that it makes contact with relay contact shim block 86 and activates relay switch 85 so that when the activation switch 5 is energized, relay switch 85 allows pinion drive motor 58 to move the slideable tray door 69 along geared racks 56 opening the aperture to allow the glass bottles to fall through and into the hammer mill blades 17 and 18. The slideable tray door 69 makes contact with relay switch 85 when the slideable tray door reaches the end of the geared racks 56 and the relay switch 85 reverses the pinion drive motor 58 so that the slideable tray door 69 returns to the closed position.

Figure 5A:
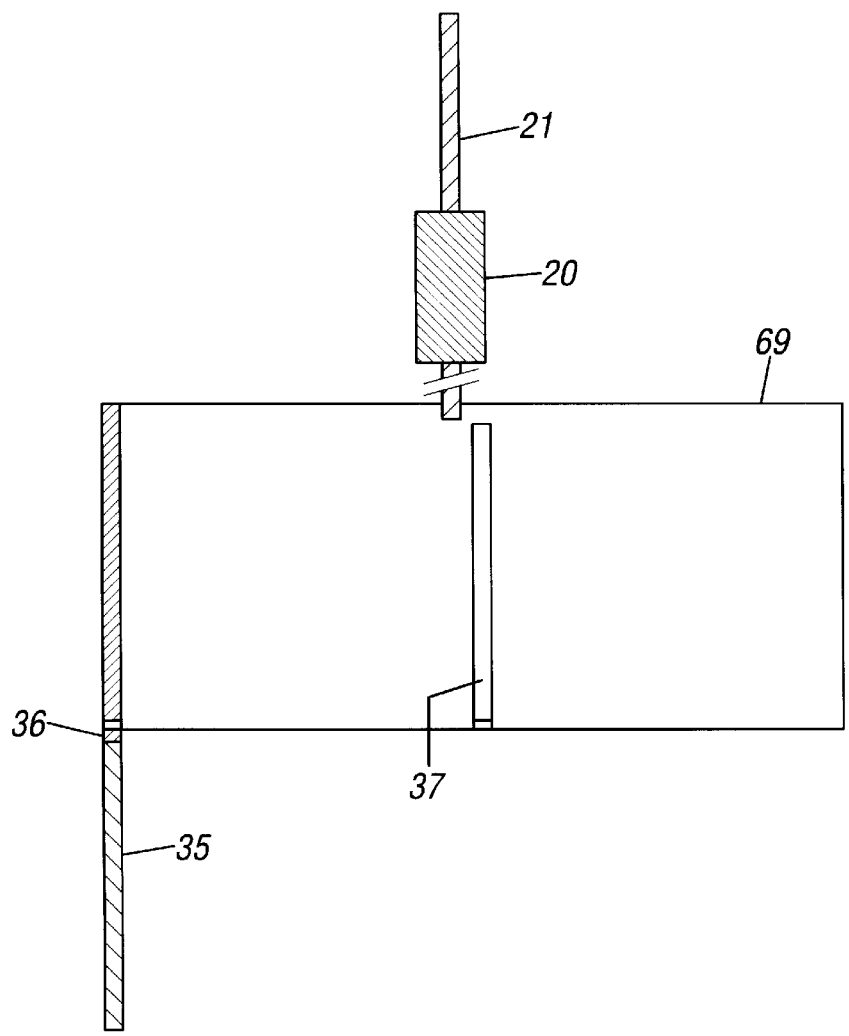
FIG. 5 is a detailed view of the movable shelf utilizing either a foldable, manual push/pull handle or a linear drive motor and worm gear detailing the preferred configuration.
Figure 5B:
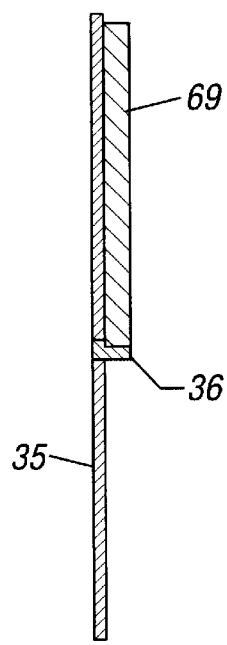

FIG. 5 shows a detailed view of the moveable (slideable) tray 69 and the access slot 37 for hammer mill blade rotary drive shaft 47 clearance plus both a manual push/pull folding arm 35 and an alternate linear drive worm gear 21 utilizing a linear drive motor 20.

Figure 6A:
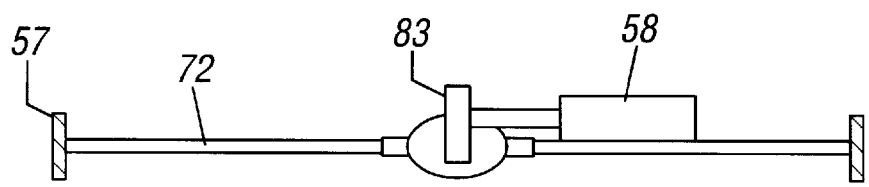
FIG. 6 is a detailed view as shown in FIG. 2 detailing the preferred configuration with some of the preferred alternative configurations detailing a rack and pinion drive mounted on the slideable tray door.
Figure 6B:
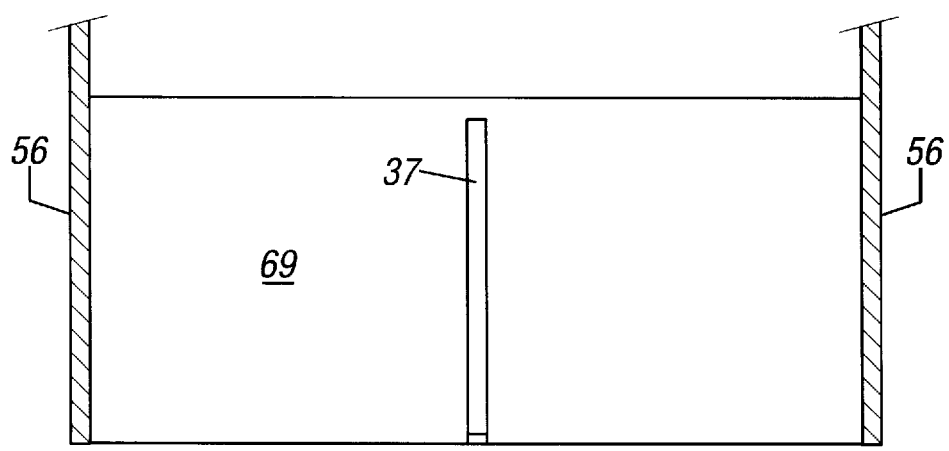

FIG. 6 shows a detailed view of the moveable (slideable) tray 69 and the access slot 37 for hammer mill blade rotary drive shaft 47 clearance and a rack 56 and pinion 57 driven by pinion drive motor 58.

Figure 7:
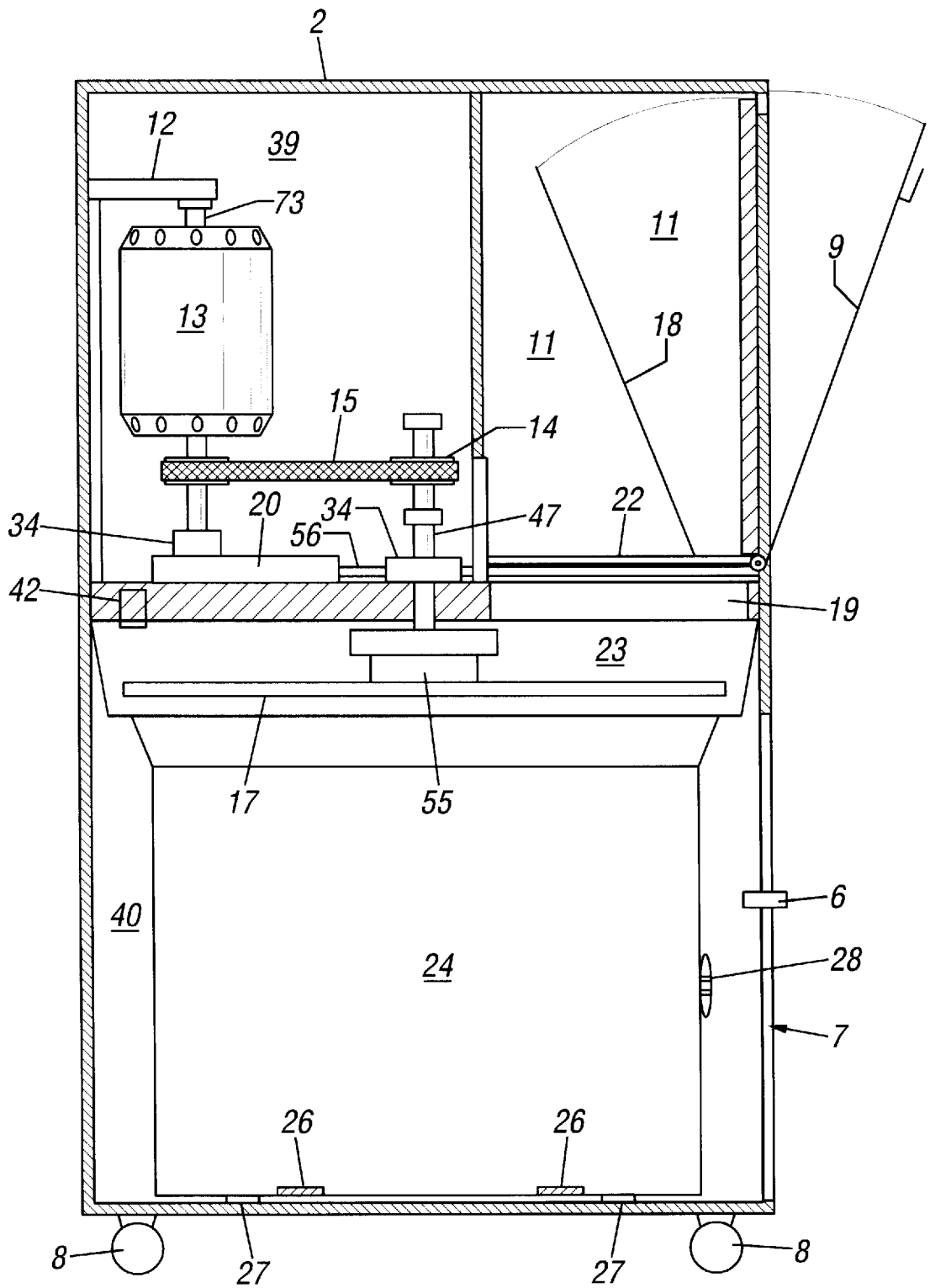
FIG. 7 is a detailed view of the apparatus utilizing a front loading door that can be protracted and retracted with the preferred configuration.

FIG. 7 shows a detailed view of the apparatus utilizing a front bottle loading bin 11 that would enable a user to load bottles while the apparatus is position under a counter. The activation switch 5, dual locking device 10, the electrical lockout safety device 61 and the cutlet bag load condition warning light 65 would be moved to the side of the apparatus to facilitate the front loading bin 11.

Figure 8A:
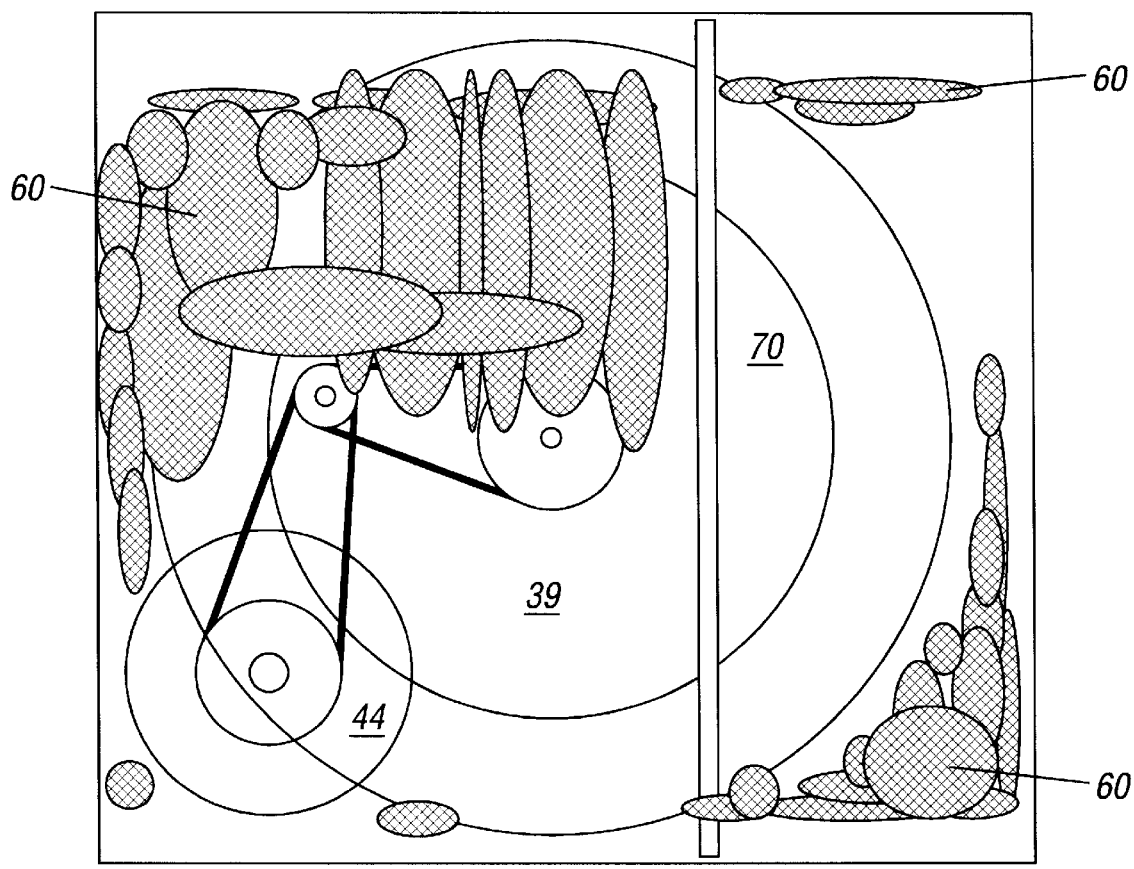
FIG. 8 is a perspective view of FIG. 2 incorporating additional preferred configurations including the placement of sound proofing materials.
Figure 8B:
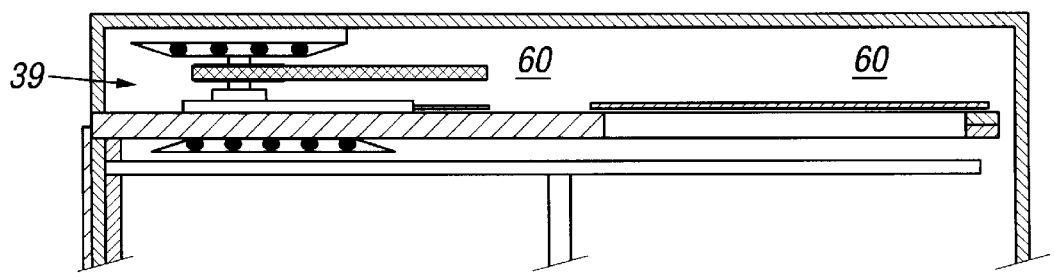
Figure 9:
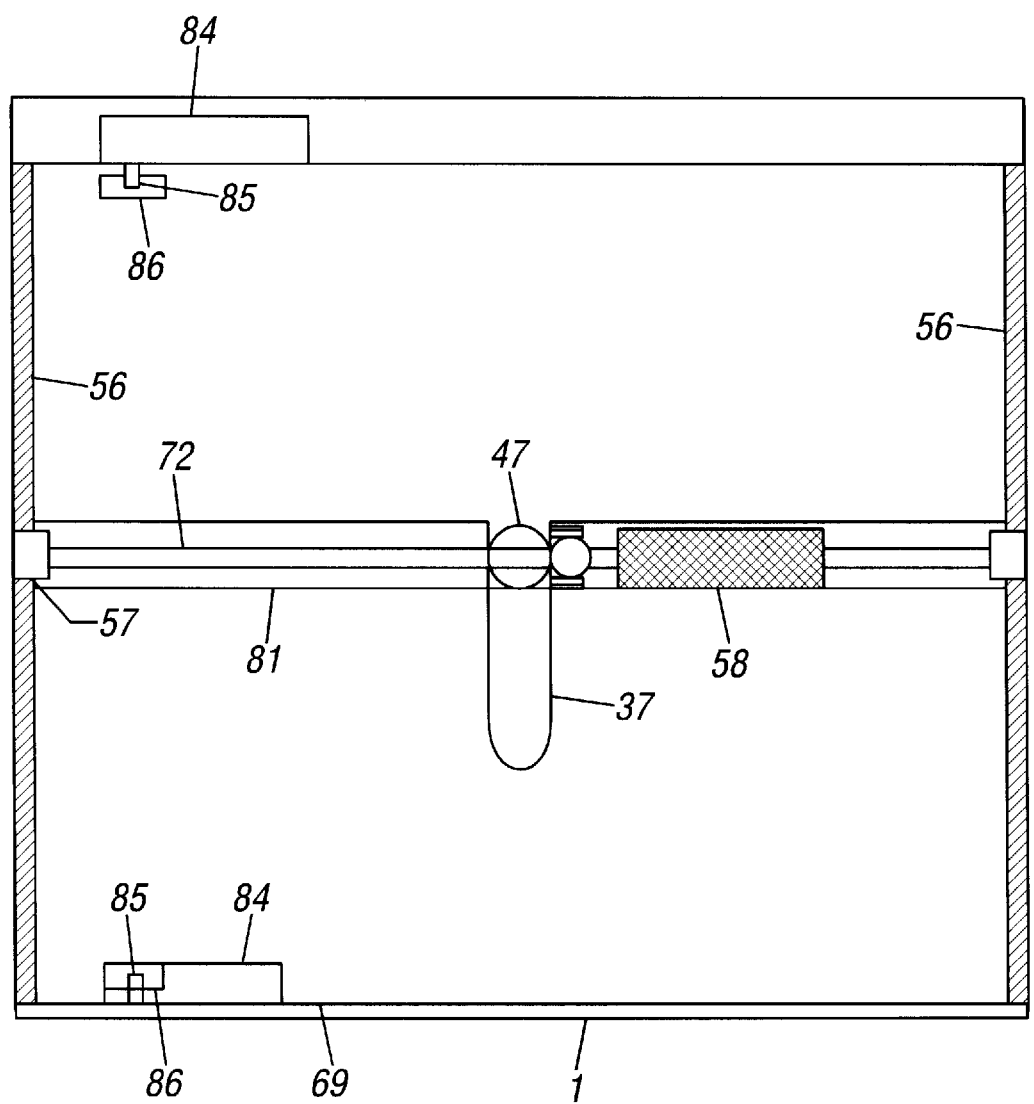
FIG. 9 is a view along cut lines A—A showing the layout of the rack and pinion attachment on the slideable tray door and a proposed arrangement of the pinion motor, pinion drive shaft, gears and matching racks.

FIG. 8 shows the preferred application of sound proofing materials 60 in the upper chamber 39 of the apparatus.

FIG. A—A is a detailed cut view of FIG. 2 showing the slideable tray door 69 with the mounting of the relay contact blocks 84, the relay switches 85 and the relay shim blocks 86, the geared racks 56, the pinion drive shaft 72 and the pinion gears 57 in apparatus cabinet 1. Also shown is the hammer mill blade rotary drive shaft 47 clearance slot 37.

OPERATION

This apparatus is designed to be placed in establishments that generate considerable and substantial amounts of empty glass bottles ranging from beer bottles to wine jugs. The invention is designed so that up to a case of empty beer bottles or several wine jugs can be placed within the upper loading chamber 11, the lid 4 closed and automatically locked and an operator then initiates the glass bottle crushing process by pushing a momentary switch 5. The process starts with the pressing of the momentary switch 5 which activates the electrical lockout devise 61 and starts the electric motor 13 thus rotating the drive 16, jack shaft 45 and hammer blade drive shaft 47 to a pre-determined speed after which reaching, enables the pinion drive motor 58 causing the pinion 57 to engage the geared rack 56 that is permanently attached to a slideable tray door 22 that is pulled rearward from the upper loading chamber 11 towards and into the equipment chamber 39 thus exposing the contents (bottles) of the loading chamber 11 to an aperture in upper and lower chamber partition shelf 19 that allows the contents (bottles) to come into contact with the hammer mill blades 17 and 25 while they are at fill pre-determined RPM speed. The use of contact relay switches 85 and the mounting of the relay shim blocks 86 so that contact with the relay contact blocks 84 enable the apparatus to be operated with a single push on the activation switch 5 and the cycle starts up and completes without any other procedures.

The contact of the contents (bottles) with the hammer mill blades 17 and 25 pulverizes the glass into a pre-determined size called cullets. The speed of the hammer mill blades 17 and 25 is critical and the configuration of the funnel shaped hammer mill blade/bottle impact area 23 to ensure the proper sizing of the cullets. The pulverized cullets then fall into a gusseted, disposable bag 63 that is held in place and supported by cullet storage box 29. The gusseted, disposable bag 63, when filled, can then be removed to the recyclable pickup area for delivery to a glass company for recycling. If the glass cullets aren't recycled, the pulverized cullets won't take up but a fraction of intact bottles in landfills.

This invention allows the originator of large amounts of empty glass bottles to economically pulverize the glass containers thus requiring substantially less storage area for the refuge discharge until the cullets are either recycled or shipped as small fragments to landfills. The size of the apparatus allows for placement in nearly every eating and drinking establishment to maximize the efforts of most such establishments to engage in as much recycling and environmentally safe trash disposal as possible.

Figure 10:
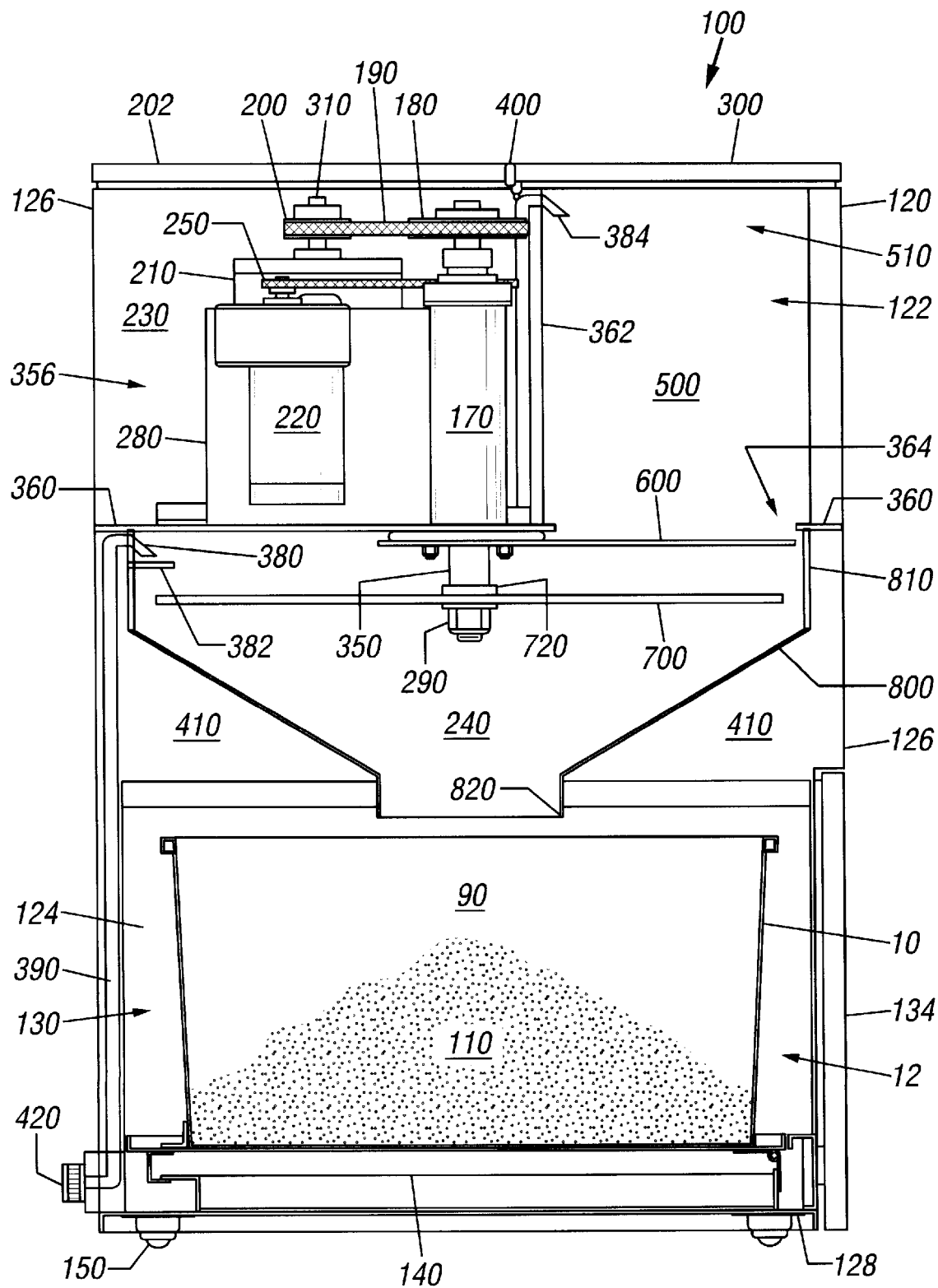
FIG. 10 is a cutaway perspective view of the apparatus embodying a preferred general principal of this inventions configuration and the placement of detailed components.
Figure 11:
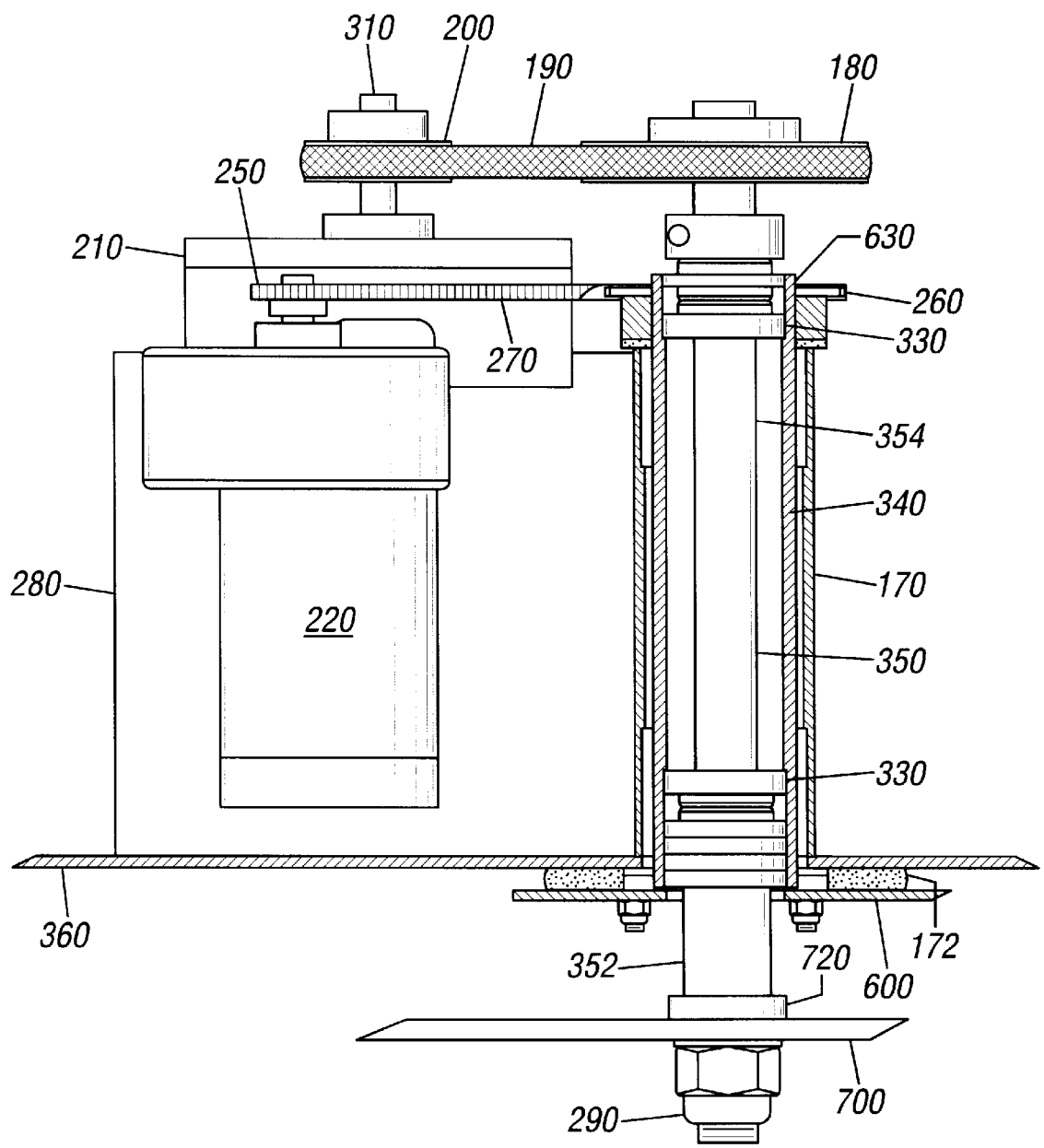
FIG. 11 is a detailed view of the motors and gear drive arrangements that drive the pinion shaft attached to the hammer mill blades and the required bearings and packing sealing.
Figure 12:
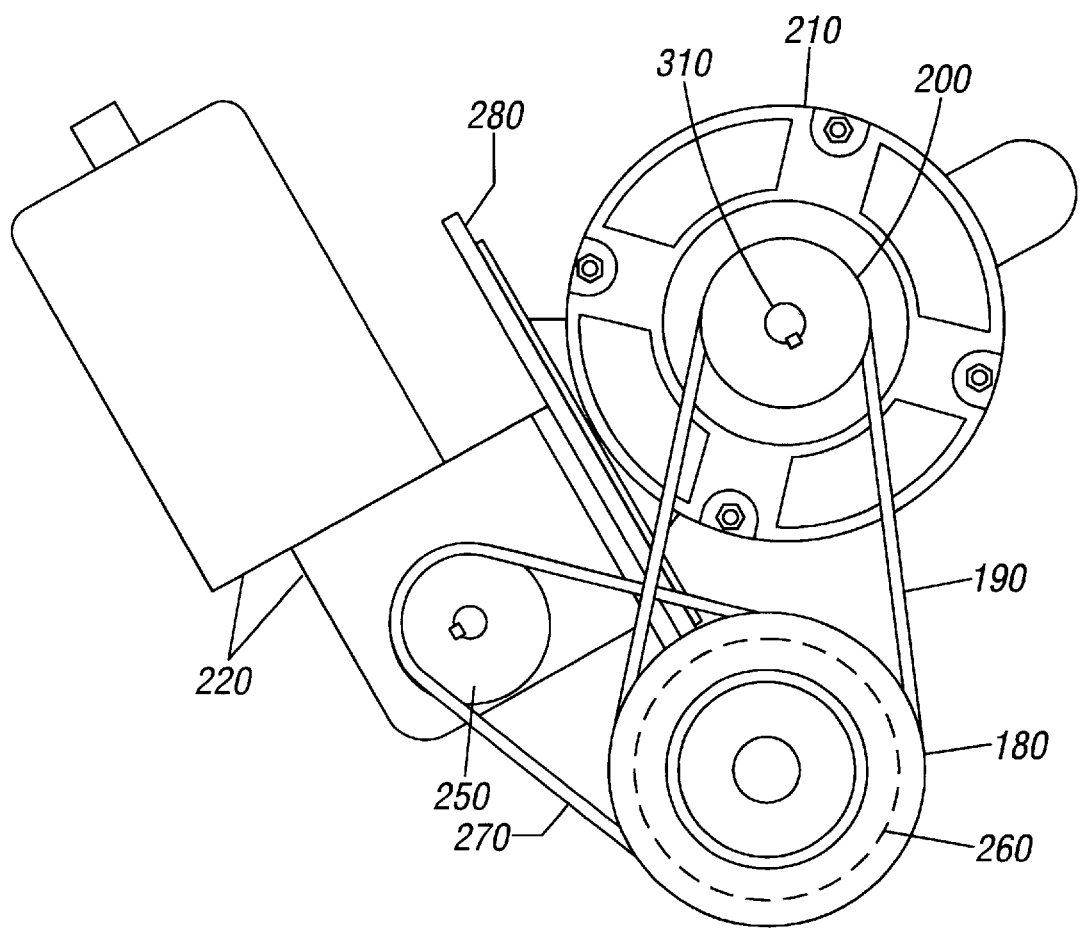
FIG. 12 is a detailed view of the mounting bracket, motors, sheaves and belt drives.
Figure 13:
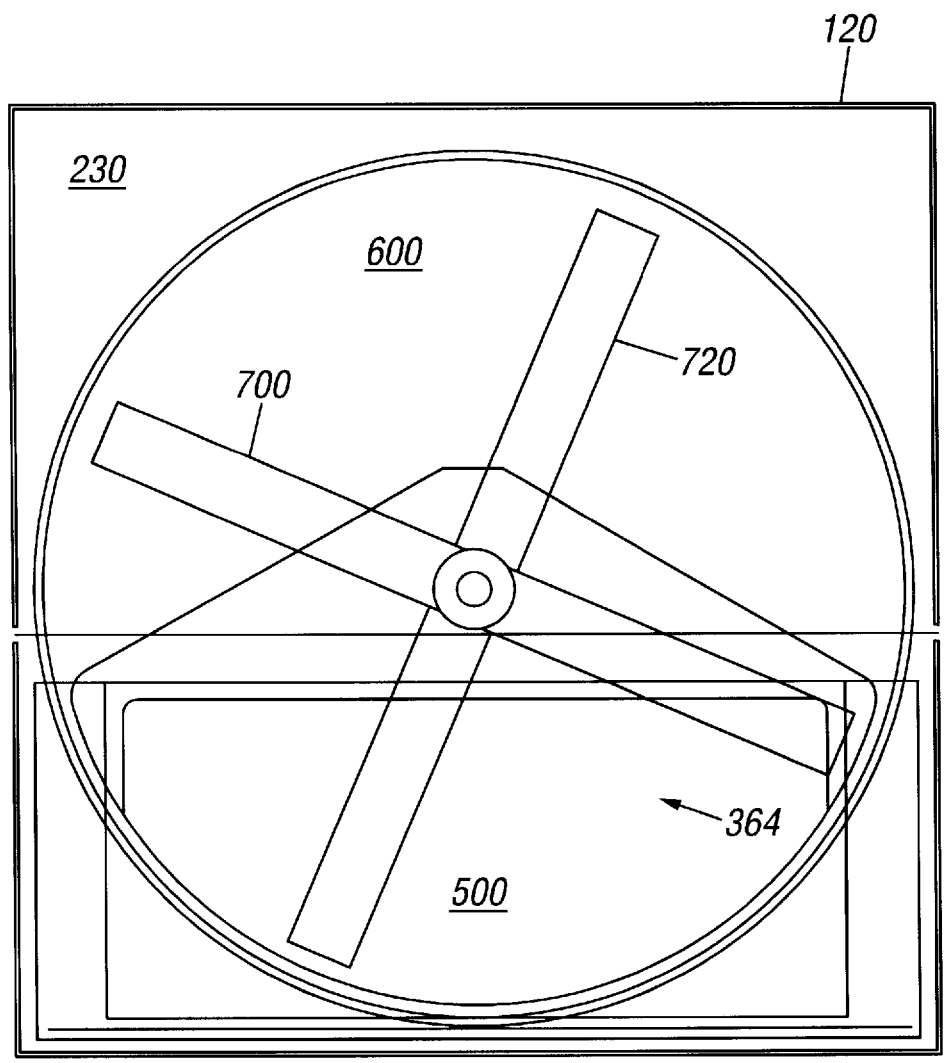
FIG. 13 is a sectional view of the apparatus, loading bin, rotary door, hammer mill blades and glass container break area.

Another embodiment of the present invention is shown in FIGS. 10–13. FIG. 10 is a cutaway perspective view of the apparatus 100 embodying a preferred general principal of this invention's configuration and the general placement of detailed components. The apparatus 100 is seen to be substantially a sealed rectangular box like device with the top encompassing a hinged portion 400 that allows the lid sections 202 and 300 to be affixed to apparatus 100 and allow lid section 300 to be opened. The forward section or loading bin area 500 is partitioned from the rearward section or equipment area 230 by wall 362. The entire loading bin area 500 is a sealed chamber on the four adjacent and opposed sides and allows rotary door 600 to be moved on a horizontal plane in a 360 degree rotary movement to allow glass containers loaded in the loading bin 500 to drop into the bottle break area 240 and be struck by the hammer mill blades 700 and 720. The broken glass cullets 110 drop through the funnel means 800 into the collection box 110 located in collection chamber 90. Weight means 140 ensures that a pre-determined amount of glass cullets 110 do not exceed a weight that would make removal difficult. Door 130 allows the apparatus 100 to be opened so the glass cullets 110 can be removed. Cleaning jet nozzle 380 is attached to a line or conduit 390 that allows cleaning fluid to be fed from intake valve 420. The wall 362 divides the loading bin 500 from the equipment area 230 in which bracket 280 holds motor 210 and motor 220. Motor 210 has motor shaft 310 on which sheave 200 is mounted. Belt drive 190 connects motor 210 to hammer mill blade shaft 350. Hammer mill blade shaft 350 has hammer mill blades 700 & 720 attached and held in place by lock nut 290. Hammer mill blade shaft 350 is located and sealed into tube 170 to ensure glass dust and cullets 110 cannot be introduced into equipment area 230. The hammer mill blade shaft 350 is sealed at both ends with packing material 320 and 330 and a polyflex seal 172. Non functional areas 410 and 120 are filled with noise suppression packing foam.

Rotary door motor 220 with a first sprocket 250 utilizing chain drive 270 attached to a second sprocket 260 that activates door 600 when apparatus 100 is activated in the run mode. The apparatus 100 is mounted with omni-directional wheels or rollers 150 to allow apparatus 100 to be easily moved.

In another embodiment of the present invention, there is provided an apparatus 100 for crushing glass that uses hammer mill blades that control the movement of a door for accessing the hammer mill blades. As shown previously, the base 128 of the apparatus 100 can have wheels to make it easier to move the apparatus. The apparatus 100 has a housing 120 having an upper chamber 122 and a lower chamber 124 being separated by a partition 360, a top 126 and a base 128. The upper chamber 122 is divided into a forward section 500 sometimes referred to as a loading bin area and a rearward section 230 sometimes referred to as an equipment area by a wall 362. The rearward section 230 is sealed from the forward section 500 and the lower chamber 124 by the wall 362 and the partition 360. Preferably, the lower chamber 124 defines a sidewall 126 having a door 134 disposed therein for removing the broken glass cullets 110. The forward section 500 defines an opening 510 therein that is positioned adjacent to the top of the housing. The partition 360 defines a hole 364 therein that is substantially the same size as the opening 510 defined by the forward section 500.

A motor means 356 is mounted within the rearward section 230 having a pulley shaft 620 connected to a hammer mill blade shaft 350 having a first end 352 and a second end 354. The first end 352 extends into the lower chamber 124. A first hammer mill blade 700 and a second hammer mill blade 720 are attached to the first end 352 of the hammer mill blade shaft 350.

A hinged lid 300 is attached to and in covering relationship with the opening 510 defined by the forward section 500. A funnel means 800 has mouth portion 810 and a neck portion 820. The mouth portion 810 is connected to the partition 360 and the neck portion 820 is connected to a receiving means. The funnel means 800 receives the crushed glass cullets and funnels them towards the receiving means 130. Preferably, there is a bar 382 attached to the mouth portion 810 of the funnel means 800 that is positioned parallel to the hammer mill blades 700 & 720 and extending inward toward the hammer mill blade shaft 350. The bar 382 keeps any glass pieces from resting on the top of the hammer mill blades.

There is a rotatable panel 600 that defines a hole 620 therein sized to fit the hole 364 formed by the partition 360 so that more than one glass container may be deposited into the apparatus at one time. The rotatable panel 600 is attached to a rotatable panel shaft 630. There is a weighing means 140 disposed in the base 128 of the housing and a means for cleaning 142 the forward section 500, the lower chamber 124, and the hammer mill blades.

In a preferred embodiment, the motor means 356 comprises a panel driving motor 220 and a hammer mill driving motor 210. The hammer mill driving motor 210 has a motor shaft 310 on which a sheave 200 is mounted. The sheave 200 is connected to the hammer mill blade shaft 350 by a hammer mill drive belt 190. The panel driving motor 220 is connected to the hammer mill driving motor 210 via a sprocket 250 and a chain drive means 270, so that the rotatable panel 600 is rotated in a plane that is horizontal with the partition 360 to an open position in response to the hammer mill driving motor 210 rotating. The hammer mill blade shaft 350 is surrounded by an inner tube 340 having a generally cylindrical shape, and the inner tube 340 is surrounded by an outer tube 170 having a generally cylindrical shape. The inner tube 340 and the outer tube 170 are sealed by a sealing means 330.

Preferably, the cleaning means comprises a first spray means 382 positioned inside the forward section 500, a second spray means 380 positioned inside the lower chamber 124, and a valve means 420 positioned adjacent to the base of the housing 120. The first spray means 382 is connected to the second spray means 380 and the valve means 420 by a conduit 390.

In yet another embodiment, there is provided a method for crushing glass containers. The method comprises providing an apparatus as described previously having hammer mill blades and a means for locking the door so the apparatus cannot be opened during operation. The apparatus is activated to crush glass containers into a plurality of cullets. The plurality of cullets are collected into a receiving means. The plurality of cullets are then weighed and the apparatus is deactivated when an amount of cullets reaches a predetermined weight.

While described herein in terms of preferred embodiments and methodologies with particularity, it will be obvious to those skilled in the art, however, that numerous additions, deletions, and modifications might well be made to the illustrated embodiments without departing from the spirit and scope of the invention as set forth in the claims.

I claim:

1. An apparatus comprising:
   a) a housing having an upper chamber and a lower chamber being separated by a partition, a top and a base, wherein said upper chamber is divided into a forward section and a rearward section by a wall, said rearward section being sealed from the forward section and the lower chamber by said wall and said partition, said forward section defining an opening therein positioned adjacent to the top of the housing, said partition defining a hole therein being substantially the same size as the opening defined by the forward section;
   b) a motor means mounted within said rearward section having a pulley shaft connected to a hammer mill blade shaft having a first end and a second end, wherein said first end extends into the lower chamber, the motor means further comprising a panel driving motor and a hammer mill driving motor, said hammer mill driving motor having a motor shaft on which sheave is mounted, wherein said sheave is connected to said hammer mill blade shaft by a hammer mill drive belt; said panel driving motor being connected to said hammer mill driving motor via a sprocket and a chain drive means, so that the rotatable panel is rotated in a plane that is horizontal with the partition to an open position in response to the hammer mill driving motor rotating;
   c) a first hammer mill blade and a second hammer mill blade being attached to the first end of the hammer mill blade shaft; wherein said hammer mill blade shaft is surrounded by an inter tube having a generally cylindrical shape, and said inner tube is surrounded by an outer tube having a generally cylindrical shape; wherein said inner tube and said outer tube are sealed by a sealing means;
   d) a hinged lid being attached to and in covering relationship with the opening defined by the forward section;
   e) a funnel means having a mouth portion and a neck portion, wherein said mouth portion is connected to the partition and the neck portion is connected to a receiving means;
   f) a rotatable panel having a hole therein sized to fit the hole formed by the partition, wherein said rotatable panel is attached to a rotatable panel shaft;
   g) a weighing means being disposed in the base of the housing; and
   h) a means for cleaning the forward section, the lower chamber and the hammer mill blades.

2. An apparatus as in claim 1, wherein the cleaning means comprises a first spray means positioned inside the forward section, a second spray means positioned inside the lower chamber, and a valve means positioned adjacent to the base of the housing, wherein said first spray means is connected to said second spray means and said valve means by a conduit.

3. An apparatus as in claim 1, further comprising a bar attached to the mouth of the funnel means being positioned parallel to the hammer mill blades and extending inward toward the hammer mill blade shaft.

4. An apparatus as in claim 1, wherein the lower chamber defines a sidewall having a door disposed therein.

5. An apparatus as in claim 1, wherein a set of wheels is attached to the base of the housing.

* * * * *